United States Patent
Heigl

(10) Patent No.: US 7,354,062 B2
(45) Date of Patent: Apr. 8, 2008

(54) ASSEMBLY FOR A SIDE GAS BAG MODULE COMPRISING A HOUSING AND A GAS GENERATOR

(75) Inventor: Juergen Heigl, Boebingen (DE)

(73) Assignee: TRW Automotive GmbH, Alfdorf (DE)

(*) Notice: Subject to any disclaimer, the term of this patent is extended or adjusted under 35 U.S.C. 154(b) by 281 days.

(21) Appl. No.: 11/120,063

(22) Filed: May 2, 2005

(65) Prior Publication Data

US 2005/0248134 A1    Nov. 10, 2005

(30) Foreign Application Priority Data

May 7, 2004    (DE)    .................. 10 2004 022 732

(51) Int. Cl.
    B60R 21/26    (2006.01)
(52) U.S. Cl. ...................... 280/740; 280/742
(58) Field of Classification Search ............... 280/736, 280/740, 741, 742
    See application file for complete search history.

(56) References Cited

U.S. PATENT DOCUMENTS

| | | | |
|---|---|---|---|
| 5,255,938 A | | 10/1993 | Brede et al. |
| 5,308,108 A | * | 5/1994 | Rion ........................ 280/728.2 |
| 5,340,147 A | * | 8/1994 | Fontecchio et al. ...... 280/728.2 |
| 5,551,724 A | * | 9/1996 | Armstrong et al. ......... 280/737 |
| 5,611,563 A | * | 3/1997 | Olson et al. ............. 280/728.2 |
| 6,293,581 B1 | | 9/2001 | Saita et al. |
| 6,299,200 B1 | * | 10/2001 | Bowers et al. ............ 280/730.2 |
| 6,543,804 B2 | | 4/2003 | Fischer |
| 6,676,154 B2 | * | 1/2004 | Fischer ....................... 280/729 |
| 6,802,532 B2 | | 10/2004 | Heigl et al. |
| 6,837,513 B2 | * | 1/2005 | Oka et al. ................ 280/728.2 |
| 6,860,506 B2 | * | 3/2005 | Ogata et al. ............. 280/730.2 |
| 7,063,350 B2 | * | 6/2006 | Steimke et al. ............ 280/729 |
| 2003/0001371 A1 | * | 1/2003 | Wackenroder et al. ...... 280/742 |
| 2003/0141705 A1 | * | 7/2003 | Oka et al. ................ 280/728.2 |

FOREIGN PATENT DOCUMENTS

| | | |
|---|---|---|
| DE | 19850448 | 5/2000 |
| DE | 29921743 | 5/2000 |
| DE | 10318133 | 10/2003 |
| DE | 20313108 | 1/2004 |
| WO | 2004/031002 | 4/2004 |

* cited by examiner

*Primary Examiner*—Ruth Ilan
*Assistant Examiner*—Joseph Rocca
(74) *Attorney, Agent, or Firm*—Tarolli, Sundheim, Covell & Tummino LLP

(57) ABSTRACT

An assembly for a side gas bag module includes a housing (10) and a gas generator (12) arranged in the housing (10). The housing (10) has at least two outflow openings (20, 22) spaced apart from each other. Between the gas generator (12) and the inner side of the housing (10) flow channels (32) are formed for the gas generated by the gas generator (12). At least one of the flow channels (32) leads to the first outflow opening (20) and at least one of the flow channels (32) leads to the second outflow opening (22). The flow channels (32) are formed by radially inward projecting beads (26, 28) on the housing (10).

8 Claims, 2 Drawing Sheets

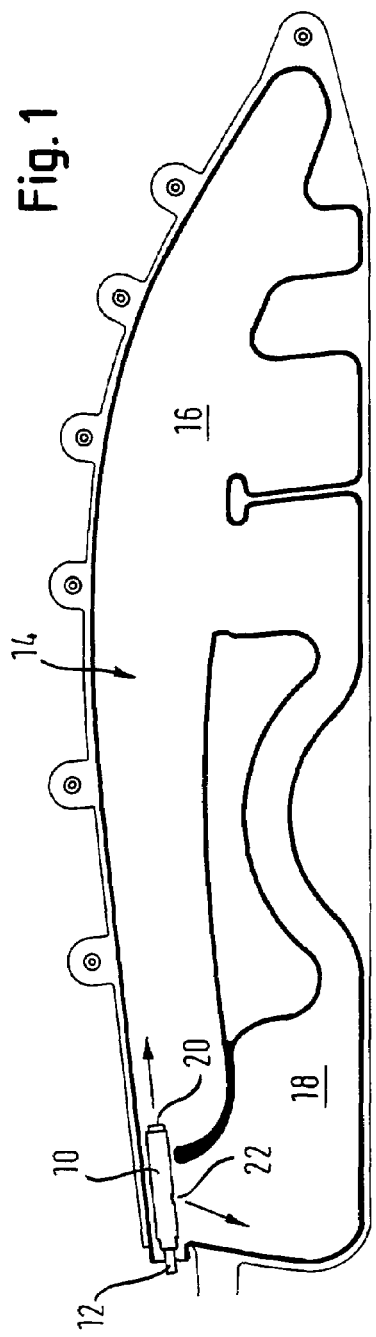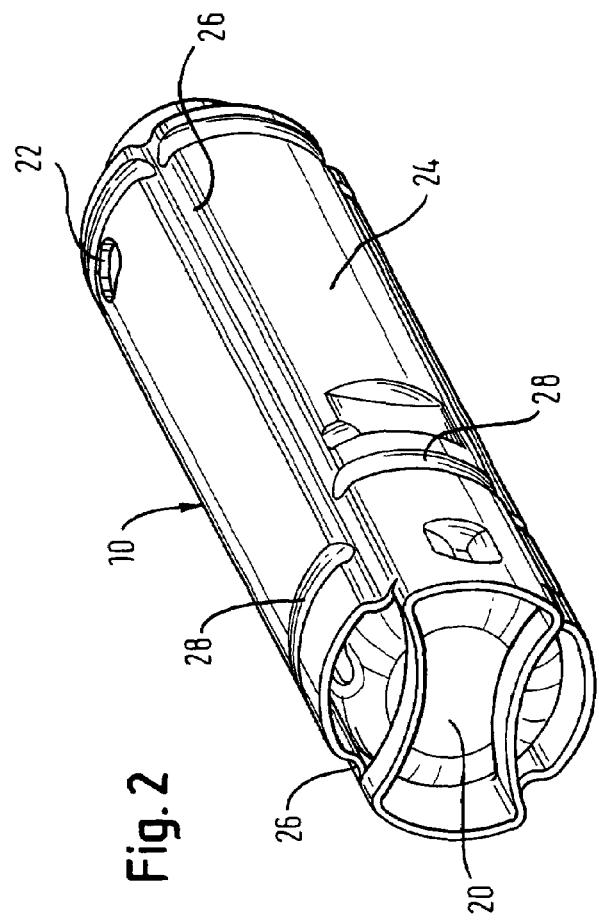

ASSEMBLY FOR A SIDE GAS BAG MODULE COMPRISING A HOUSING AND A GAS GENERATOR

TECHNICAL FIELD

The invention relates to an assembly for a side gas bag module, in particular to an assembly comprising a housing and a gas generator arranged in the housing. The invention further relates to a side gas bag module for an occupant restraint system in a motor vehicle and also to an occupant restraint system for a motor vehicle.

BACKGROUND OF THE INVENTION

Hitherto, in the case of elongated side gas bags for the supply and distribution of gas, generally gas lances with a plurality of openings or gills arranged in a defined manner have been used. In the published German patent application DE-A-106 38 546, deviating from the concept mentioned before, a gas guide part arranged in the gas bag and made of a flexible material, which is able to be folded, is proposed.

It is an object of the invention to enable a defined gas distribution with compact components in the case of an elongated gas bag of a side gas bag module.

BRIEF SUMMARY OF THE INVENTION

According to the invention, an assembly for a side gas bag module includes a housing and a gas generator arranged in the housing. The housing has at least two outflow openings spaced apart from each other. Between the gas generator and the inner side of the housing flow channels are formed for the gas generated by the gas generator. At least one of the flow channels leads to the first outflow opening and at least one of the flow channels leads to the second outflow opening. The flow channels are formed by radially inward projecting beads on the housing. Different chambers of the gas bag can be filled independently of each other via the two outflow openings. Therefore, the housing of the assembly according to the invention has the function of a distributor housing which is able to be constructed with a relatively small overall length, rendering a gas lance or the like superfluous. By an appropriate construction of the flow channels, the gas distribution can be coordinated, according to vehicle type, with the individual gas bag chambers, in particular their size, so that a desired unfolding behaviour of the gas bag can be achieved.

Preferably, the housing has an elongated cylindrical section and two end sections. The first outflow opening is formed in one of the end sections and the second outflow opening is formed in the cylindrical section of the housing. Such a construction makes possible an effective simultaneous filling of a front gas bag chamber via the first outflow opening and of a rear gas bag chamber via the second outflow opening.

The gas generator preferably has a diffusor with several discharge openings. The discharge openings are distributed radially over the entire periphery of the diffusor.

The flow channels can further be delimited by beads on the gas generator.

In the preferred embodiments of the invention, in axial direction on both sides of the discharge openings of the diffusor, beads are provided on the housing. The beads run substantially in a peripheral direction and do not extend over the entire circumference of the housing. Thereby, a specific distribution of the gas stream into a part flowing to the (front) first outflow opening and into a part flowing to the (rear) second outflow opening can be achieved. In particular, the beads running in peripheral direction can be subsequently impressed into the housing, so that the gas distribution characteristic of the assembly according to the invention can be established at a relatively late stage in the production of the side gas bag module.

The invention also provides a side gas bag module for an occupant restraint system in a motor vehicle. The side gas bag module includes an assembly according to the invention and further comprises a gas bag having at least first and second chambers. The first outflow opening opens into the first chamber and the second outflow opening opens into the second chamber.

Finally, the invention also provides an occupant restraint system for a motor vehicle. The occupant restraint system includes a side gas bag module according to the invention, in which the assembly according to the invention is arranged in the region of a C-column or in the region of a D-column of the motor vehicle. Such an arrangement of the assembly according to the invention in a rear vehicle region, which is possible with an appropriate design of the gas bag chambers, is basically preferable to an arrangement in the central vehicle region, for reasons of space.

BRIEF DESCRIPTION OF THE DRAWINGS

FIG. 1 shows a side gas bag module according to the invention with an unfolded gas bag in side view;

FIG. 2 shows a housing of an assembly according to the invention in perspective view;

DETAILED DESCRIPTION OF THE PREFERRED EMBODIMENT

Figure 3:
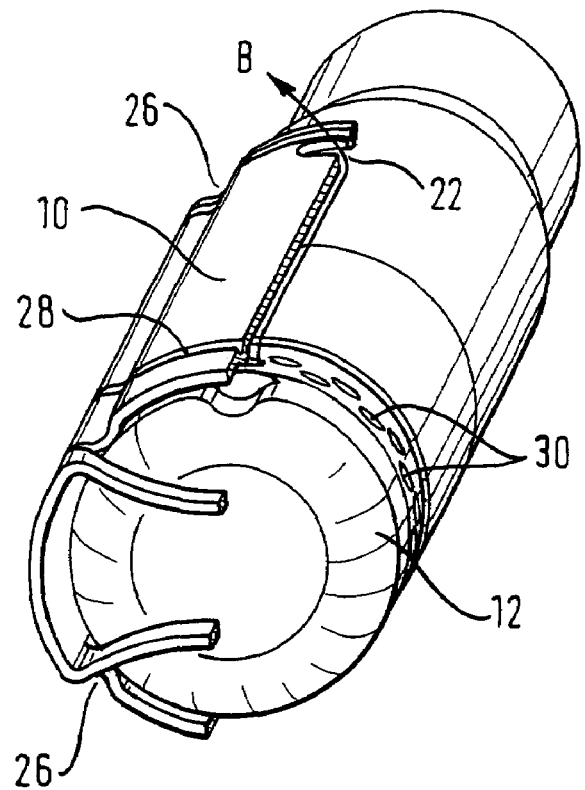
FIG. 3 shows an assembly according to the invention with a partially opened housing in perspective view.

In FIG. 1 a side gas bag module is illustrated. The side gas bag module comprises a distributor housing 10, in which a gas generator 12 is arranged, and an unfolded gas bag 14. The gas bag 14 extends over the entire side region of the interior of a motor vehicle. In the example embodiment shown, the gas bag 14 has a first chamber 16 covering the B-column region of the vehicle, and a second chamber 18 covering the C-column region. The assembly of the housing 10 and of the gas generator 12 is arranged, in this case, in the region of the C-column. In vehicles with a D-column, the assembly can also be arranged in the region of the D-column. The housing 10 has first and second outflow openings 20 and 22, respectively. The first outflow opening 20 opens into the first chamber 16 and the second outflow opening 22 opens in to the second chamber 18.

It can be seen in FIG. 2 that the housing 10 has a shape similar to a closed cylinder with an elongated cylindrical section 24 and two end sections. The overall length of the housing 10 is substantially smaller than that of a conventional gas lance. The first outflow opening 20 is formed in one of the end sections of the housing 10, whilst the second outflow opening 22 is provided at the opposite end of the housing 10 in the cylindrical section 24. Therefore, the gas generated by the gas generator 12 can escape from the housing 10 through the first outflow opening 20 in axial direction on the one hand and through the second outflow opening 22 in radial direction on the other hand. The housing 10 has several axial beads 26, which extend substantially over the entire length of the housing. In the housing 10 illustrated in FIG. 2, this results in a cloverleaf-like cross-section. In addition, several beads 28 running in peripheral direction are provided. However, the beads 28 do not extend over the entire periphery of the housing 10.

Figure 4:
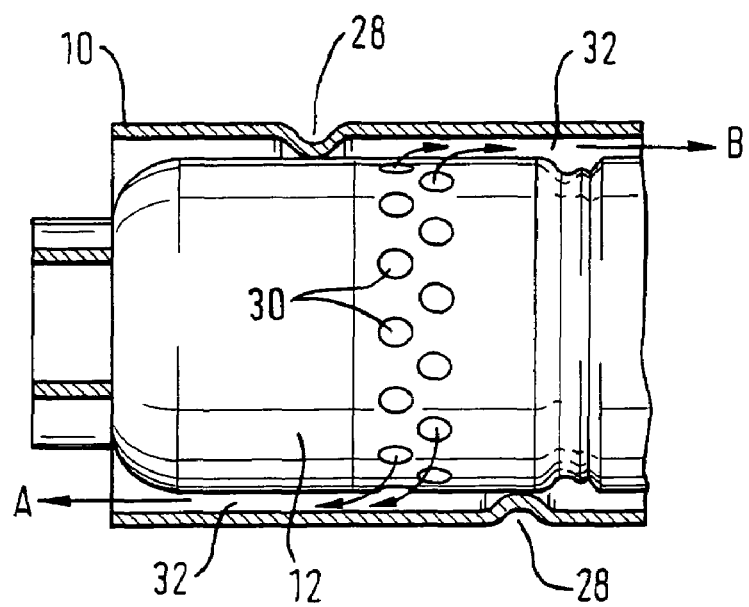
FIG. 4 shows a lateral internal view of a part of an assembly according to the invention.

The function of the beads 26 and 28 regarding the gas distribution can be seen from FIGS. 3 and 4. The gas generator 12 held in the housing 10 has a diffusor with a plurality of discharge openings 30. The discharge openings 30 are uniformly distributed over the entire periphery of the diffusor. As can be seen in particular in FIG. 4, between the gas generator 12 and the inner side of the housing 10, flow channels 32 are formed, which are delimited by the beads 26 and 28.

The gas generated by the gas generator 12 emerges under great pressure from the discharge openings 30. The gas can move basically in both axial directions between two axial beads 26. The beads 28 running in peripheral direction, which are arranged on both sides of the discharge openings 30, however, provide partially for an axial separation. Thus, the gas flowing out from the adjacent discharge openings 30 is only allowed to either flow in the direction of the first outflow opening 20 (arrow A) or in the direction of the second outflow opening 22 (arrow B). The specific arrangement of the beads 28 running in peripheral direction therefore determines how great the proportion of the gas flowing to each of the outflow openings 20, 22 is.

In addition to the housing 10, the shaping of the gas generator 12 can also contribute to the formation of the flow channels 32.

The invention claimed is:

1. An assembly for a side gas bag module, the assembly comprising a housing and a gas generator arranged in the housing, the housing having at least two outflow openings spaced apart from each other, wherein between the gas generator and the inner side of the housing flow channels are formed for the gas generated by the gas generator, at least one of the flow channels leading to the first outflow opening and at least one of the flow channels leading to the second outflow opening, the flow channels being formed by radially inward projecting beads on the housing.

2. The assembly according to claim 1, wherein the housing has an elongated cylindrical section and two end sections, the first outflow opening being formed in one of the end sections and the second outflow opening being formed in the cylindrical section of the housing.

3. The assembly according to claim 2, wherein the elongated section defines axial and radial directions, the flow channels and the outflow openings being configured such that the gas escapes from the housing through the first outflow opening in an axial direction and from the second outflow opening in a radial direction.

4. The assembly according to claim 1, wherein the gas generator has a diffusor with several discharge openings, the discharge openings being distributed radially over the entire periphery of the diffusor.

5. The assembly according to claim 3, wherein in axial direction on both sides of the discharge openings of the diffusor, beads are provided on the housing, the beads running substantially in a peripheral direction to partially provide for an axial separation for the gas emerging from the discharge openings in the diffusor, the beads not extending over the entire circumference of the housing.

6. The assembly according to claim 1, wherein the flow channels are further delimited by beads on the gas generator.

7. A side gas bag module for an occupant restraint system in a motor vehicle, the side gas bag module comprising:
an assembly including a housing and a gas generator arranged in the housing, the housing having at least two outflow openings spaced apart from each other, wherein between the gas generator and the inner side of the housing flow channels are formed for the gas generated by the gas generator, at least one of the flow channels leading to the first outflow opening and at least one of the flow channels leading to the second outflow opening, the flow channels being formed by radially inward projecting beads on the housing; and
a gas bag having at least first and second chambers, the first outflow opening opens into the first chamber and the second outflow opening opens into the second chamber.

8. An occupant restraint system for a motor vehicle, the occupant restraint system including a side gas bag module as defined in claim 7, wherein the assembly is arranged in the region of a C-column or in the region of a D-column of the motor vehicle.

* * * * *